May 30, 1967  L. A. AMTSBERG ETAL  3,322,205
AUTOMATIC RECYCLING NUT RUNNER

Filed April 7, 1965  5 Sheets-Sheet 2

INVENTORS
LESTER A. AMTSBERG
WILLIAM K. WALLACE
BY
Stephen J. Rudy
ATTORNEY.

May 30, 1967 L. A. AMTSBERG ETAL 3,322,205
AUTOMATIC RECYCLING NUT RUNNER
Filed April 7, 1965 5 Sheets-Sheet 3

INVENTORS:
LESTER A. AMTSBERG
WILLIAM K. WALLACE
BY
Stephen J. Rudy
ATTORNEY

INVENTORS:
LESTER A. AMTSBERG
WILLIAM K. WALLACE
BY
Stephen J. Rudy
ATTORNEY.

United States Patent Office 3,322,205
Patented May 30, 1967

3,322,205
AUTOMATIC RECYCLING NUT RUNNER
Lester A. Amtsberg, Utica, and William K. Wallace, Barneveld, N.Y., assignors to Chicago Pneumatic Tool Company, New York, N.Y., a corporation of New Jersey
Filed Apr. 7, 1965, Ser. No. 446,315
20 Claims. (Cl. 173—12)

This invention is concerned with a pneumatically driven torque controlled nut runner. It is of a type which initially cycles to drive a threaded fastener to a predetermined degree of tightness, then stops for a short interval, and thereafter automatically repeatedly recycles at short intervals to deliver torque of said predetermined degree to the work.

A general object of the invention is to provide an improved torque controlled nut runner having advantageous torque transmission and power controlled characteristics as well as other features which render it suitable for use in single nut running applications, and especially suitable for use in multiple nut running applications.

A fault of known nut runners is a tendency of the driving clutch mechanism following delivery of an initial release torque to continue operating, such as by ratcheting, to impart to the driven fastener through the clutch mechanism a series of torque impulses the magnitude of which exceeds that of the initial release torque.

A fault of other types of nut runners, which makes them unsuitable for use in multiple nut running applications, is their "one-shot" characteristics, whereby each runner in the unit upon delivering a predetermined torque to its work automatically shuts-off or stops operating independently of the others. This fault is undesirable in certain multiple nut running applications, such as in a situation wherein a rigid cover and housing having a gasket between them are to be secured together by means of a ring of bolts. In this situation, because of various factors some bolts reach a predetermined degree of tightness before others but lose tension after the others have been tightened and thus are required to be retightened. Each "one-shot" runner in such a situation stops operating independently of the other runners after the bolt it is driving has reached a predetermined degree of tightness; and even though the bolt may subsequently lose tension, the runner nevertheless does not resume operation to retighten the bolt.

These faults are not present in the nut runner embodying the present invention.

A feature of the nut runner of the present invention is a torque controlled cam release clutch which functions to steadily drive a threaded fastener to a predetermined degree of tightness, whereupon the clutch releases and stops for a short interval and thereafter intermittently operates or recycles until finally interrupted to transmit to the driven member of the clutch a series of torque impulses the magnitude of which do not exceed but are equal to that of the initial release torque.

Another feature of the nut runner of the present invention is a power cut-off control mechanism. This automatically acts upon attainment of a predetermined maximum torque by the clutch to interrupt flow of pneumatic driving power to the clutch, and after a controlled time delay resumes transmission of such power; and repetitively continues such action without and consequent ratcheting action occurring in the clutch member.

Another feature of the invention is a manually operable cam mechanism for locking the motor against rotation when at rest so as to enable a test torque to be applied to the output spindle of the tool.

A more particular object of the invention, accordingly, is to provide a torque controlled nut runner embodying the foregoing features.

A still further object of the invention is to provide a multiple nut running apparatus including a plurality of the aforementioned nut runners, together with an integrated electrical monitoring control system whereby each of the nut runners will initially cycle to drive its work to a predetermined degree of tightness and thereafter will automatically repeatedly recycle until all of the runners have finally driven their associated work fasteners to a predetermined degree of tightness.

A still further object of the invention is to provide a pneumatically powered nut runner having a cam release clutch including a driven member and a driving member wherein the driving member functions to deliver a predetermined maximum torque to the driven member, then releases its driving relation with the driven member, rotates thereafter relative to the driven member for a few degrees without reengaging and comes to a halt.

In accordance with the invention there is provided a torque controlled nut runner comprising a pneumatic motor, an output spindle, a torque releasable cam clutch coupling the motor to the output spindle, means responsive to releasing action of the clutch to shut off pneumatic power to stop the motor, means responsive to stopping of the motor to rotate it momentarily in a reverse direction to re-engage the clutch, means cause resumption of pneumatic power to the motor following such re-engagement, and time delay means to delay the resumption of such pneumatic power to the motor for a predetermined interval.

The invention further lies in the particular structure and arrangement of its various components, as well as in their cooperative association with one another to effect the results intended herein.

The foregoing as well as other objects, features, and advantages of this invention will appear more fully hereinafter from a consideration of the detailed description which follows, taken together with the accompanying drawings wherein an embodiment of the invention is illustrated. It is to be expressly understood, however, that the drawings are for purposes of illustration and description, and they are not to be construed as defining the limits of the invention.

In the accompanying drawings:

FIGS. 3 and 3A are continuations of one another in longitudinal section; FIG. 3 represents the upper half of one the tool units of the nut running apparatus, and FIG. 3A represents the lower half;

Figures 1, 2:
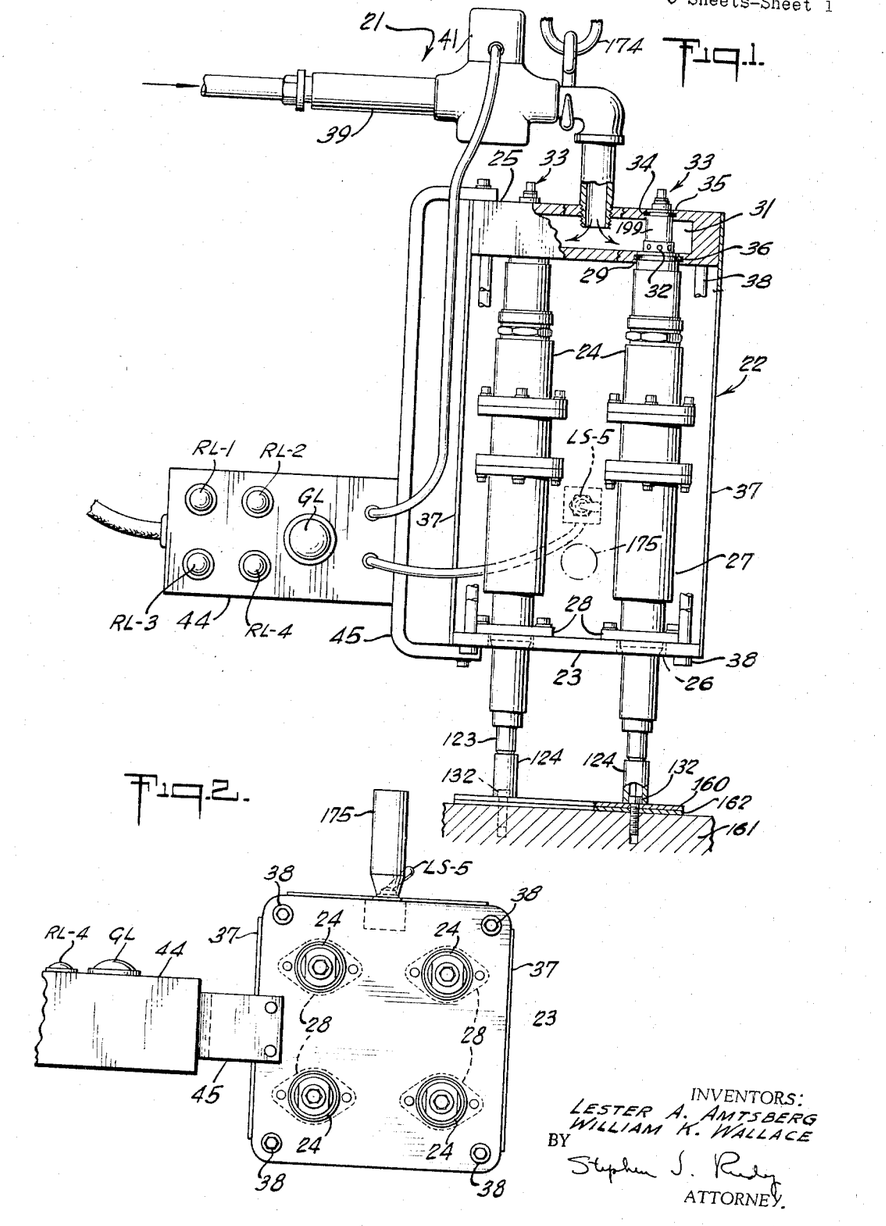
FIG. 1 is an elevational view of multiple nut running apparatus embodying the invention.
FIG. 2 is a bottom plan view thereof.
Figure 1A:
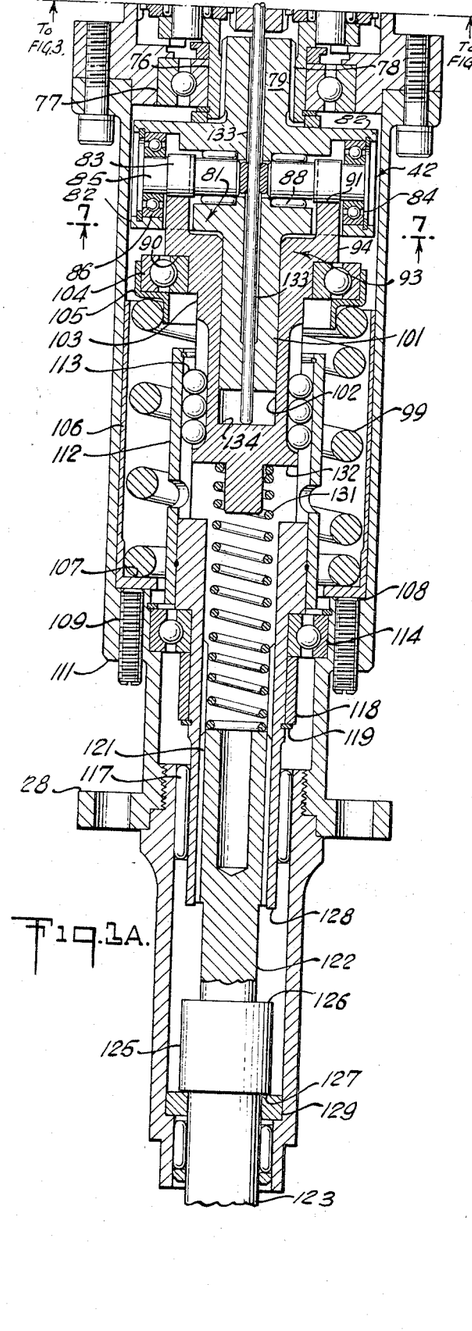

Reference is now directed to the several figures of the drawings wherein there is disclosed in FIGS. 1 and 2 a multiple nut running apparatus, designated generally by the reference numeral 21. It comprises a holding frame or chassis 22 wherein there is mounted upon a gangplate 23 a group of nut running tools or tool units 24. Operating air is distributed simultaneously to the several tool units from a manifold member 25 of the holding frame. This manifold collars and also supports the tool units at their upper ends. The gangplate 23 has a plurality of apertures 26 through each of which depends the lower end of the general housing 27 of a tool. A mounting flange 28 of the housing of each tool is bolted fast to the upper face of the gangplate to rigidly secure the tool to the latter. The manifold 25 has a plurality of openings 29 in its underface, each of which is axially aligned with one of the gangplate apertures 26. These manifold openings communicate with an air distributing chamber 31 interiorly of the manifold. An upper end of each tool extends into a separate one of the manifold openings 29, so as to communicate inlet passages 32 of the tool with the manifold chamber. The upper end of the housing of each tool is fitted with a signal switch mechanism 33 which projects in part externally through a top opening 34 of the manifold. O-rings 35 and 36 respectively seal the openings 34 and 29 of the manifold against leakage around the tool to the outside. Side plates 37, together with a plurality of tie rods 38 extending between the manifold and gangplate serve to hold the manifold and gangplate in desired spaced relation to each other. Operating air is fed to the manifold through a supply line 39 connecting the manifold with a suitable pneumatic source, not shown. The flow of operating air to the manifold is controlled by a solenoid operated valve 41 connected in the supply line.

Each tool 24 is provided with a maximum torque cam release clutch, generally designated 42 in FIG. 3A. This clutch is adapted to release its driving relation to the work and come to a stop upon experiencing torque overload when the work has been driven to a predetermined degree of tightness, but it is adapted to nevertheless automatically re-engage and recycle thereafter at short time intervals to produce, until finally interrupted, a series of torque impulses the magnitude of each of which does not exceed but is equal to the release torque. During the recycling operations the torque delivered by the clutch will take up any relaxed tension or looseness that might have developed in the work, but the clutch will not deliver to the work any greater torque than that required to bring the work up to the predetermined degree of tightness.

Figure 10:
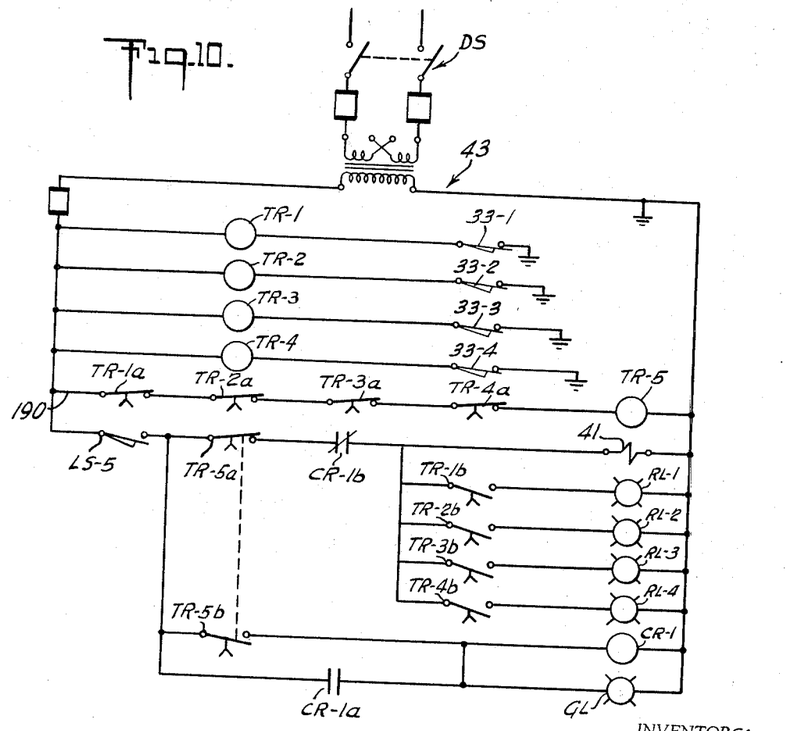
- FIG. 10 is a diagram of the monitoring control circuit.

The solenoid controlled valve 41, and the signal switch mechanism 33 associated with each tool are integrated in a monitoring or control circuit 43 (FIG. 10). The control circuit, functions to initiate as well as to terminate operation of the several tool units. In the multiple nut running apparatus of FIG. 1, each tool operates to drive its associated work to a final degree of tightness, but nevertheless thereafter continues to recycle at short intervals until all of the tools have similarly tightened their work, whereupon the control circuit functions automatically to simultaneously discontinue operation of all of the tools. The control circuit is housed in a box 44 (FIG. 2) mounted to a side bracket 45 of the framework. The circuit acts through red colored signal lamps RL-1 to RL-4 (FIG. 10) to indicate to the operator when each tool has driven its associated work to a predetermined degree of tightness; and its acts through a further green colored signal lamp GL to indicate when all of the tools have finally driven their associated work to the said degree of tightness.

The nut running tool unit 24 (FIGS. 3, 3A) represents an important feature of this invention and a decided technical advance in the art of pneumatically driven torque clutch release nut runners. Its general housing or casing 27 is defined by a succession of housing sections connected in end to end relation. Supported in this housing is a conventional air driven motor of the slidable blade type. It includes the usual rotor 46 which rotates in a chamber 47 defined by a surrounding liner 48. Radially slidable in the rotor are the usual air driven blades 49 which sweep the surrounding wall of the liner as the rotor rotates. The rotor is supported by means of an upper shaft end 51 thereof in a bearing 52 mounted in a stationary bearing plate 53; and it is further supported by means of a lower shaft end 54 thereof in a bearing 55 mounted in a stationary bearing plate 56. The bearing plates 53 and 56 close over opposite ends of the rotor chamber 47.

Figure 3:
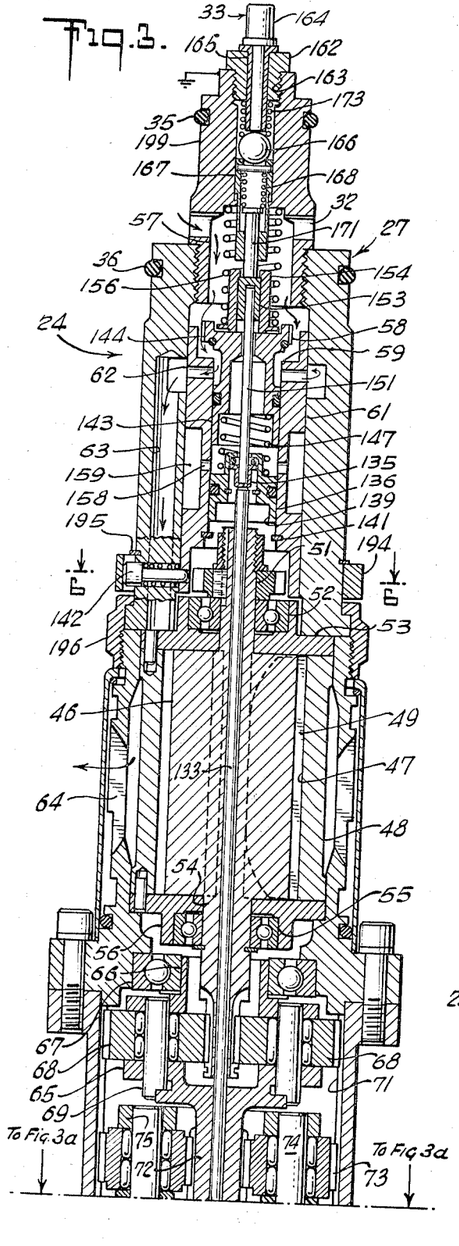

Operating air is fed from the manifold 25 to the rotor 46 through the inlet passages 32 at the upper end of the tool. Air entering these passes flows into a control valve chamber 57, from where it then flows around a normally open control valve 58 and through a valve seat opening 59 formed in a valve block 61 to radial ports 62 of the latter. From these radial ports it flows through housing passages 63, and connecting passages, not shown, leading through the upper bearing plate 53 and the liner 48 to the rotor chamber 47. Air spent in operating the rotor is rapidly exhausted through suitable side vents 64 of the housing, so as not to retard the operating power of the motor.

The motor transmits rotary power through a train of double stage reduction gearing to the clutch 42. The reduction gearing includes a first stage comprising a spindle cage 65 having a hollow axial upper stub shaft 66 supported for rotation in a bearing 67 mounted in the housing. The lower shaft 54 of the rotor depends axially through shaft 66 into the spindle cage and has a straight splined driving engagement with idler gears 68. The idler gears are supported by the usual pin and bearing means 69 in the spindle cage. The idler gears in turn are meshed with a stationary internal ring gear 71 defined by the housing. An axially depending spindle portion 72 of the spindle cage has a straight splined driving engagement with a second set of idler gears 73. The latter are supported by the usual pin and bearing means 74 in a spindle cage 75 of a second stage of the reduction gearing. The idler gears 73 in turn are meshed with a lower area of the ring gear 71. The spindle cage 75 has an axially depending hollow spindle 76 which is supported for rotation in a bearing 77 mounted in the housing.

Figure 7:
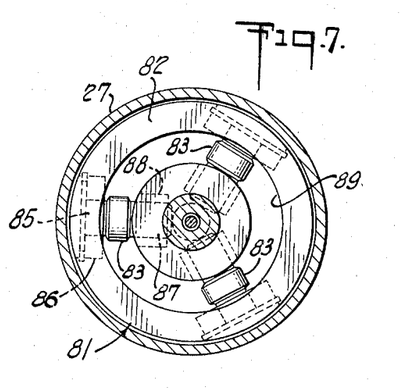
FIG. 7 is a section on line 7—7 of FIG. 3A directed to showing the underside of the upper driving clutch member; the upper portion of the lower driven clutch member has been omitted from this view for added clarity.

The spindle 76 has an internal straight splined driving connection 78 with an upper axially extending shaft portion 79 of the driving or upper member 81 of the clutch 42. The clutch 42 is a spring loaded torque releasable cam clutch, wherein the driving clutch member is adapted to release its driving relation from a driven clutch member 93 from attaining maximum torque delivery. Incorporated (FIGS. 3A, 7) in a radially extending body section 82 of clutch member 81 are three cam rollers 83 spaced 120 degrees apart. Each roller is disposed in a separate radially extending recess 84. A pin 85 extending from the outer end of each roller is supported in a bearing 86, and an oppositely extending pin 87 is supported in a bearing 88. Each roller rotates in an annular channel 89 opening through the undersurface of the body 82 of the upper clutch member.

Figure 8:
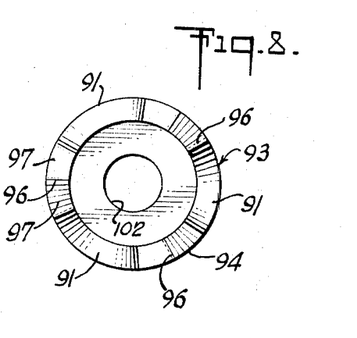
FIG. 8 is a detail of the upper cam face of the lower driven clutch member.
Figure 9:
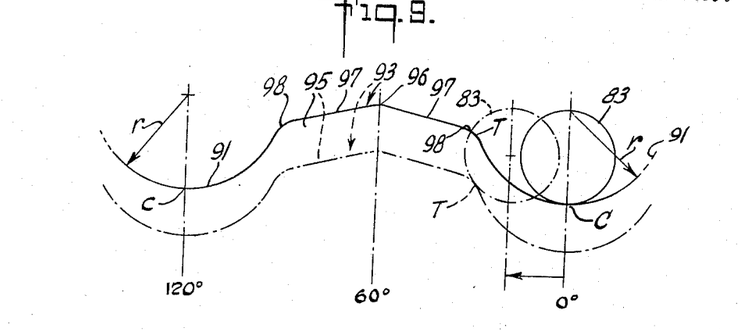
FIG. 9 is a development view showing different operative positions of a cam roller of the driving clutch mem

The rollers are normally seated or engaged (FIGS. 3A, 9) in arcuate pockets or troughs 91 formed in an opposite end face of an annular wall portion 94 of the lower driven clutch member 93. This annular wall portion 94 rotates in the channel 89. The troughs 91 are three in number, and are spaced 120 degrees apart from center to center, as indicated in FIGS. 8 and 9. Each trough has a radius $r$ which is considerably greater than the radius of the roller 83 seated therein. Here, the radius $r$ of the trough is indicated in FIG. 9 as being twice that of the roller. Each trough is spaced from the next trough by means of a cam lobe or tooth 95 of general triangular configuration. The cam tooth has a peak or crest 96 which is centered between the neighboring troughs, or 60 degrees from the bottom centers of the troughs. The crest 96 is defined by a slight radius at the vertex of a pair of oppositely sloping cam surfaces 97. Each cam slope 97 declines at a slight angle and merges at the base of the cam tooth with the high end of one of the troughs. The merging ends are tangent to a cam surface 98 having a slight radius of curvature.

The upper clutch member 81 rotates in a fixed horizontal plane; and has driving engagement with the lower clutch member 93 during the time that the rollers are seated in the troughs, as in FIGS. 3A and 9. This driving engagement is initially had when the rollers are seated substantially at the bottom centers C of the troughs (FIG. 9). Each roller has this position while the clutch is running down a free running fastener. As the tightness of the work and its resistance to rotation increases, the roller moves over the floor of its trough toward the high end thereof, increasing its torque delivery as it does so. Maximum torque delivery is attained when the roller reaches the point of tangency T of the floor of the trough with the cam surface 98, as indicated by the position of the roller in broken line in FIG. 9. When the rollers reach this point T, maximum torque delivery will have been attained and the work will have been driven to a predetermined degree of tightness, whereupon the resistance of the work causes the upper clutch member to release its driving relation from the driven clutch member as it carries the rollers beyond the point T. The lower clutch member 93 is axially movable relative to the upper clutch member 81; and is constantly biased toward clutched engagement with the upper clutch member by means of a heavy clutch spring 99. The lower clutch member is caused to move out of or become released of this clutched relation as the cam rollers ride out of the troughs onto the cam slope 97 beyond the point T of maximum torque delivery. The broken line 93 in FIG. 9 shows the moved position of the lower clutch member 93 when the roller has reached the point T at which maximum torque is delivered.

The lower clutch member 93 is guided in its axial movement by means of a cylindrical shaft portion 101 (FIG. 3A) of the upper clutch member. This shaft 101 depends with a slide fit in an axial bore 102 formed in a depending stem 103 of the lower clutch member. The clutch spring 99 carries at its upper end a bearing retainer 105 containing a bearing 104 the inner race of which abuts an overlying shoulder 90 of clutch member. The clutch spring depends into a deep bearing cup 106 and limits upon a bottom annular shoulder 107 of the latter. The bearing cup 106, in turn, is seated upon an internal annular shoulder 108 of the housing. Accordingly, the lower clutch member 93 is rotatable relative to the clutch spring. Screw means 109 threadable in an external shoulder 111 of the tool into abutment with the underside of the shoulder of the bearing cup 106 is provided to adjust the preload tension of the clutch spring. The adjustment of the screw means determines the maximum or release torque deliverable by the driving clutch member 81 to the driven clutch member 93.

The stem 103 of the lower clutch part is arranged to drive an intermediate hollow spindle 112. Ball spline and straight groove connections 113 transmit rotation of the driven clutch member 103 to the intermediate spindle. The ball spline connections also allow axial movement of the driven clutch member 93 relative to the intermediate spindle 112. The latter spindle is supported for rotation in a bearing 114 mounted in the housing; and is further supported adjacent its lower end by a needle bearing 117. The intermediate spindle 112 is restrained against axial movement relative to the housing by means of a spacer 118 positioned between the bearing 114 and a retaining ring 119 anchored in the spindle.

Rotation of the intermediate spindle 112 is transmitted through a slidable straight splined driving connection 121 to an output spindle 122. This output spindle is received at its upper end axially into the intermediate spindle; and has axial movement relative to the intermediate spindle and housing. A terminal portion 123 of the output spindle projects externally through the bottom of the tool's housing, and carries at its end a suitable fitting 124 (FIG. 1) for driving a threaded fastener. Here, the fitting is shown as a wrench socket adapted to engage a threaded fastener, such as a bolt 132. A cylindrical enlarged portion or collar 125 intermediately of the output spindle provides a pair of end shoulders 126, 127, the upper shoulder 126 of which is cooperable with the bottom end 128 of the intermediate spindle to limit the extent of upward movement of the output spindle; the lower shoulder 127 cooperates with a bushing 129 to prevent escape of the output spindle from the bottom end of the housing. A light compression spring 131, disposed internally of the intermediate spindle 112 between the upper end of the output spindle 122 and an under shoulder 132 of the lower clutch member 93, constantly biases the output spindle relative to the housing to its lowermost position upon the bushing 129.

This spring loaded slidably splined arrangement of the output spindle 122 relative to the intermediate spindle 112 is of advantage, particularly in multiple nut running applications wherein the nut running apparatus is held or suspended in a stationary or fixed position. In such applications the several output spindles 122 of the apparatus may be slidably raised so as to allow the work 132 (FIG. 1) to be positioned below the sockets 124; the spindles may then be lowered to engage the sockets with the work under the tension of their springs 131.

The clutch 42 acts through the stages of reduction gearing 65, 75, and the intermediate and output spindles 112, 122 to run the work down to a predetermined degree of tightness. In doing this, the cam rollers 83, as earlier explained, ride over the concaved bottoms or floors of the troughs 91 to the high points T (FIG. 9) of the troughs, at which points maximum torque delivery is attained. As the rollers move over the bottoms of the troughs, they progressively cam the driven lower clutch member 93 axially downward, as indicated in FIG. 9 in broken line.

Figure 4:
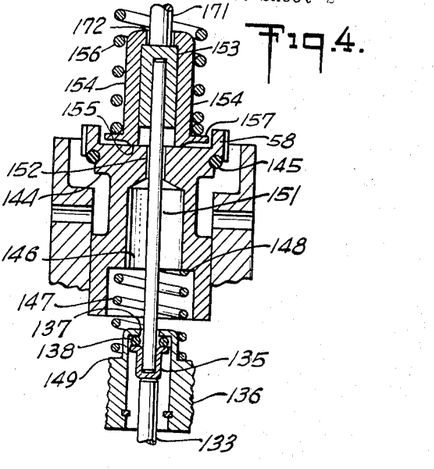
FIG. 4 is an enlarged detail of the arrangement of the pilot valve and associated elements.

In response to this axial movement of the lower clutch part, air control means automatically functions to interrupt flow of operating air to the motor at about the time that the rollers have completed delivery of the predetermined maximum torque and are moving over the high points T of the troughs. This control means (FIGS. 3, 3A, 4) includes a long control rod 133 the bottom end of which abuts an internal bottom wall 134 of the lower clutch member 93. This rod extends upwardly, in order, axially and slidably through the upper clutch member 81, the spindle cages 75, 65 of the reduction gearing, and the shaft ends 54, 51 of the rotor. Its top end abuts the underside of a pilot cup valve 135. The pilot valve has limited axial movement in a valve case 136 relative to an axial aperture 137 in the latter; and is normally held seated over the aperture 137. The valve case 136 has an open bottom end 139 normally held raised above a stop ring 141 anchored in an internal wall of the valve block 61. The latter block is fixed relative to the housing. The valve block 61 opens through opposite ends thereof. The control valve 58 has a depending piston portion 143 slidable in the upper end of the valve block. The control valve further has a head 144 carrying at its underside an O-ring seal 145. The latter cooperates with the annular valve seat 59 in controlling flow of operating air from the control valve chamber 57 to the rotor chamber 47. A valve opening spring 147 limiting between shoulders 149, 148 respectively of the pilot valve case 136 and a recess 146 in the bottom end of the control valve normally holds the control valve raised above its seat, as appears in FIGS. 3 and 4. A short thin control rod 151 is seated at its bottom end in the cup of the pilot valve 135; and it extends upwardly with some clearance through the aperture 137 of the pilot valve case 136. It further extends with some clearance axially through an aperture 152 of the head 144 of the control valve. Above the control valve the short rod carries a cylindrical cap 153. Seated over the cap is an inverted spring cup 154. The valve opening spring 147 holds the head end 144 of the control valve in abutment with an annular bottom end 155 of the spring cup; while a control valve closing spring 156 limiting between a flange 157 of the spring cup and an internal wall of the housing holds the spring cup 154 seated over the cap of the short rod 151. The closing force of spring 156 is relatively greater than the opposing opening force of the opening spring 147, but is normally disabled by the elevated condition of the short rod 151 from transmitting a closing force to the control valve.

Figure 11:
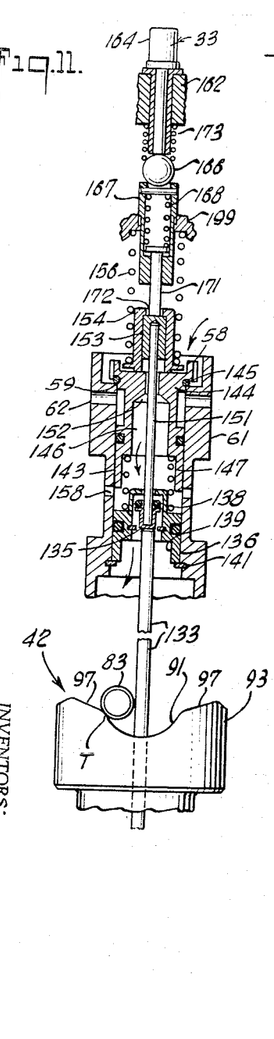
FIG. 11 shows the condition of the tool unit of FIGS. 3, 3A upon delivery of maximum torque by the clutch to the output spindle.

The operation of the air control means just described in response to the axial movement of the lower clutch member 93 relative to the upper clutch member 81 is as follows: Referring now to FIGS. 3, 3A, 11–13, as the lower clutch member 93 is forced downward by the camming action of the rollers in moving over the bottoms of the troughs to the high ends thereof, the long and short control rods, 133, 151 together with the pilot valve 135 and the control valve 58 follows the axial downward movement of the lower clutch member under the pressing force of the closing spring 156. The valve case 136 follows the downward movement of the pilot valve under the pressure of spring 147. The control valve 58 is moved to its closed condition over its seat 59 just as maximum torque delivery is transmitted to the work and the latter is thereby caused to be tightened to a predetermined degree of tightness. This action occurs when the rollers reach the high point T. Simultaneously, or slightly before the closing of the control valve 58 the bottom end of the valve case limits upon the stop ring 141, and the pilot valve 135 moves slightly further down to open condition relative to the clearance 137. This action exhausts the recess 146 and the connected chamber 159, which were previously pressurized by bleed air around the rod 151. Air exhausting through the pilot valve passes through vents, not shown, leading to the rotor chamber. The position of the control valve and related elements at this time is shown in FIG. 11.

Figure 12:
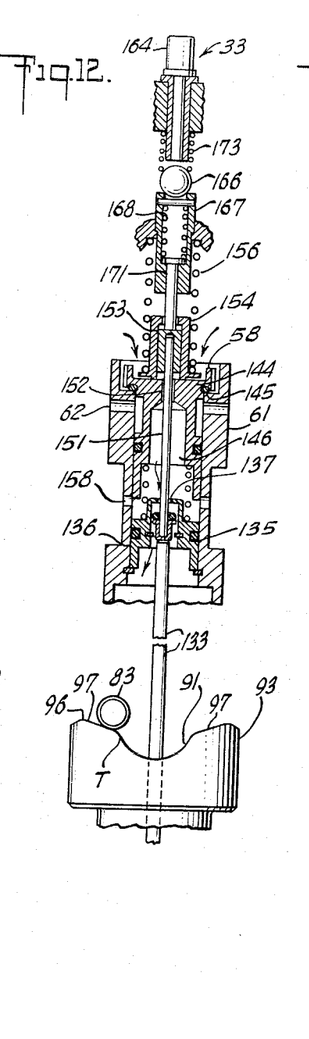
FIG. 12 shows the condition of the tool unit of FIGS. 3, 3A when the rollers have moved on to the cam slopes beyond the position shown in FIG. 11.
Figure 13:
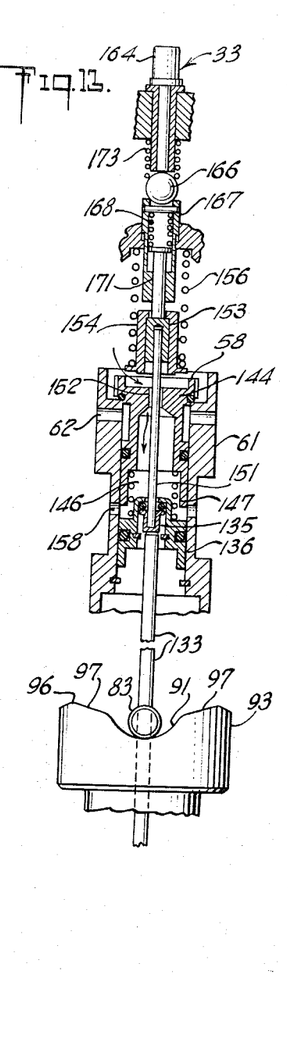
FIG. 13 shows the condition of the tool unit of FIGS. 3, 3A when the rollers have moved down from the cam slopes back into the cam pockets preparatory to a recycling operation.

Closing of the control valve 58 shuts off operating air to the motor, but before coming to a full stop, the rotor overruns for a revolution or two following the seating action of the control valve and the consequent interruption of operating air flow. This overrun is, however, brief due to braking action of the motor in the manner of a vacuum pump following shut-off of operating air. Overrun is further resisted by reacting forces of the heavy clutch spring 99. This limited overrun is substantially absorbed or dissipated by the two stages of reduction gearing 65 and 75. It is however, enough to cause the rollers 83 to ride onto the cam slopes 97 for a few degrees or slightly beyond the point T of maximum torque delivery before coming to a halt. The position of the parts at this time is shown in FIG. 12. The overrun is never great enough to cause the rollers to ride over the peaks 96 of the cam teeth 95 into the next troughs. Any torque transmitted to the driven clutch member by the rollers as they ride on the cam slopes is of a value below that of the maximum torque delivered at the point of tangency T, and it is absorbed in causing the lower clutch member to move further axially downward. The tangency point T represents a transition from the cam surface 91 of increasing torque transmission up to the point T to a cam slope 97 of decreasing torque transmission beyond point T.

Because slight further depressing or axial movement of the lower clutch member occurs as a consequence of the rollers riding beyond the troughs or point T onto the cam slopes 97, the pilot valve 135, control rods 133 and 151 accordingly move slightly further down.

The air control means described above not only functions to cause interruption of operating air flow to the motor when maximum torque delivery is attained, but it also functions automatically to cause the motor to recycle at a frequency of short time intervals until, as will be later described, final stopping of the operation of the motor occurs. As soon as the rotor stops and the rollers come to a halt as in FIG. 12 on the cam slopes 97 following interruption of the air flow to the rotor, the strong force of the clutch spring 99 constantly pressing upwardly against the lower clutch member 93 acts through the cam slopes 97 of the latter to force the rollers 83 to roll in a reverse direction down the slopes back into the troughs 91 to their normal positions at the bottom of the troughs, as in FIG. 13. Responsive to this clutch re-engaging action, the long and short control rods 133 and 151 are returned to their normal elevated condition by the upward movement of the lower clutch member. As the long control rod is re-elevated it re-seats the pilot valve 135 to closed condition relative to the aperture 137; and, as the short control rod 151 restores, it raises the spring cup 154 and the associated valve closing spring 156 clear of the now seated control valve 58. The valve opening spring 147 is, however, at this time (FIG. 13) unable to re-open the control valve against the opposing greater pressure of air in the inlet chamber 57 acting over the upper surface or head 144 of the control valve. This air pressure differential is a result of trapped air having been previously exhausted through the pilot valve 135 from the recessed underside 146 of the control valve and chamber 159. The function of chamber 159 is to increase the volume of recess 146. Chamber 159 is completely isolated except for the ports 158 connecting it to recess 146.

The time during which the control valve remains closed is brief or momentary. The raised condition (FIG. 13) of the flanged spring cup 154 relative to the aperture 152 and to the control valve now permits air from the inlet chamber 57 to bleed through the aperture 152 into the recess 146 at the underside of the control valve. The now closed pilot valve 135 prevents escape of this bleed air. Accordingly, the control valve remains closed until the air pressures above and below the control valve become substantially balanced, whereupon the opening spring 147 acts to return the control valve to open condition. The interval of time during which the control valve remains closed may be regulated by changing the size of the clearance at 152 and the volume of the recess 146 at the underside of the control valve.

The reopening of the control valve is timed so that air is supplied to the motor before the rollers 83 traveling in a reverse direction back into the troughs 91 can reach the reverse side of the cam. This action combined with the fact that, when traveling in the forward direction, the motor stops operating before the rollers can ride over the peaks 96 of the cam teeth is of decided advantage. The two features described above not only prevent a negative torque from being applied to the work but also keep out all slack in the drive connections. This avoids hammering of the driving clutch member against the driven clutch member and consequently a torque impulse to the driven member of greater magnitude than the release torque. This feature avoids the undesirable ratcheting action that occurs in certain known torque cam clutch release nut runners, when the driving clutch member continuously rotates relative to the driven clutch member. The undesirable ratcheting in these known devices delivers torque impulses to the driven member of greater magnitude than the release torque. As a result, delivery of a precise torque to the work is not obtainable, and overtightening often results. In the device of the present invention a precise predetermined maximum torque is delivered to the work which is equal to the release torque; and overtightening of the work does not occur.

Following re-opening of the control valve, operating air flow to the motor is resumed and the motor recycles. Repeated recycling operations occur in this manner as long as operating air is being supplied to the control valve chamber 57. Assuming that no relaxation or looseness has developed in the tension of the work so that it remains at the predetermined degree of tightness to which it has been initially driven, the rollers 83 will on each recycle operation ride out of the troughs, as before, onto the cam slopes and the operating air flow will be interrupted as before. No increase in torque is transmitted during the recycling operations to the work beyond the predetermined maximum release torque. Each torque impulse imparted to the driven clutch member during the recycling operations is equal to but does not exceed the said maximum torque. It is however obvious that, if for some reason, some relaxation or looseness does develop in the tension of the work following the initial cycle or following one of the repeat cycles, this looseness will be taken up and the work retightened to the predetermined degree of tightness during the next repeat cycle of operation.

The repetitive recycling feature of the tool and its capacity to maintain, during each cycle of operation, a degree of torque delivery which does not exceed a predetermined maximum or release torque, and which enables any relaxation developing in the tension of the work to be taken-up on the next repeat cycle, makes the tool especially useful in multiple nut running applications. This is particularly so in a case, as illustrated in FIG. 1, where a rigid cover 160 and a housing 161 having a gasket 162 in between them are to be tightened together by means of a ring of bolts 132. In such cases, some bolts which have been tightened may become loose as others are subsequently tightened, so that it becomes necessary to re-drive the loosened bolts to the predetermined degree of tightness.

In FIGS. 1 and 2 the holding frame 22 is shown as accommodating four of the tool units 24. It is understood that the holding frame may be provided with a manifold and gangplate of sufficient size to accommodate as many tool units 24 as there are bolts 132 to be tightened.

Each of the tool units 24 has incorporated therein a signal switch mechanism 33, as earlier mentioned. These are integrated in the monitoring control circuit 43 (FIG. 10) and function through the circuit to signal to the operator various phases in the operation of the several tool units. The monitoring control circuit further functions automatically in response to these signals to not only finally shut off operating air to the several tool units, but to also delay such action until all of the tool units have finally driven their work to the predetermined degree of tightness.

The signal switch mechanism 33 (FIG. 3) includes a pipe plug 162 threaded axially into a bore 163 at the upper end of the housing 27. A stationary electrical terminal contact 164 is fixed axially of the plug. It is electrically insulated from the housing by means of a sleeve 165. It depends freely into the bore 163 and its bottom end contacts a movable ball contact 166. The latter is seated atop a cylindrical holder 167 which is axially slidable in the housing bore 163. Interiorly of the holder is a spring 168 which is normally compressed between the seat of the holder and the head of a slide pin 171. The slide pin depends slidably through the bottom of the holder and through an aperture 172 (FIG. 4) of the spring cup 154 so as to abut the upper end of the short control rod cap 153. The slide pin is normally held by the cap 153 elevated in the holder 167 whereby it compresses the spring and tensions the holder 167 to hold the ball contact 166 closed against the terminal contact 164. An overhead contact release spring 173 tends to urge the ball contact downward to open condition, but is prevented from doing so by the stronger opposing force being exerted by the contact closing spring 168. The ball contact is designed to move to open condition under the load of the overhead spring 173 momentarily after the control valve has closed upon its seat; that is, just after maximum torque has been delivered. This occurs as the rollers ride out of the troughs 91 beyond the point of maximum torque delivery T onto the cam slopes, as in FIG. 12. This latter action causes the control rods 133 and 151 and the slide pin 171 to drop far enough to allow the contact closing spring 168 to relax sufficiently to permit the overhead spring 173 to depress the ball contact 166 to open condition. It is obvious from the repetitive recycling action that takes place in the operation of the tool, that the signal switch 33 will repeatedly open and close in response to the reciprocating action of the control rods. The housing 27 of the tool serves as electrical ground for the signal switch.

The monitoring circuit FIG. 10 in which the signal switch 33 of each tool of the multiple nut running apparatus is incorporated includes a separate signal lamp in the group RL-1 to RL-4, preferably of red color, for each signal switch.

In summary of the operation of the apparatus, after a main disconnecting switch DS is manually closed, cicruits are established through each of the normally closed signal limit switches 33, designated in the circuit as 33-1 to 33-4, to energize corresponding time delay relays TR-1 to TR-4. Energization of the time relays cause corresponding normally closed spring contacts TR-1a to TR-4a in a line 190 to open; and further causes corresponding normally open spring contacts TR-1b to TR-4b to close.

When the circuit is thus conditioned, a manually operable control switch LS-5 is closed. This establishes a circuit through a normally closed time relay contact TR-5a and a holding contact CR-1b to energize the solenoid controlled valve 41; and also establishes circuits through the now closed contacts TR-1b to TR-4b to light the red signal lamps RL-1 to RL-4. Energization of the solenoid controlled valve 41 causes flow of operating air through the supply line 39 (FIG. 1) to the manifold to operate the several tool units 24. The illuminated red lamps RL-1 to RL-4 indicate the tools are in the process of delivering torque to the work; and as long as a red lamp remains illuminated it indicates that the corresponding tool has not as yet finally run its work down to a predetermined degree of tightness.

As soon as the signal switch 33 of one of the tools is actuated to open condition (FIG. 12), the corresponding time relay of the group TR-1 to TR-4 will be de-energized, causing the corresponding contact of group TR-1b to TR-4b to open and extinguish the associated red signal lamp. This will indicate that the work of the corresponding tool has been driven to a predetermined degree of tightness. Until all the tools have reached this stage, each tool will nevertheless continue to recycle and its signal switch will accordingly repeatedly close and open. But, closing of the signal switch during a recycle operation will not normally re-energize the associated time relay, because of the rapidity of the recycling operation and the short interval during which the signal switch remains closed. The recycling frequency is at a rate of one or more cycles per second. If, however, the work of one of the tools should loosen or relax in its tension following the tightening of the work of the other tools, then the looseness of the work of that particular tool will be taken up during the next recycling operation, as earlier explained; and if, because of the time required to retighten the work, the related signal switch remains closed beyond the time preset for energizing its associated time relay, then the latter will reenergize and the corresponding signal lamp will again light up.

Accordingly, the several tools of the apparatus will cycle and recycle until all of the tools have driven their work to the predetermined degree of tightness. As each time relay (TR–1 to TR–4) is de-energized and remains so, the corresponding contact of the group TR–1b to TR–4b opens to extinguish the associated red lamp; and the corresponding contact of the group TR–1a to TR–4a closes. When all of the latter contacts have closed and remain so, a circuit is established to energize the time relay TR–5. Energization of the latter opens the normally closed contact TR–5a and closes a normally open contact TR–5b. Whereupon, the solenoid controlled valve 41 is de-energized to shut off flow of operating air through the manifold to the several tools, causing them all to simultaneously stop operating. Closing of contact TR–5b establishes circuits to energize a holding relay CR–1 and to illuminate a green signal lamp GL. Illumination of the latter indicates to the operator that all of the tools have ceased operating and that all of the tools have driven their work to a predetermined degree of tightness. Energization of relay CR–1 closes the normally open holding contact CR–1a and opens normally closed contact CR–1b. The now closed contact CR–1a holds the green lamp GL energized until the operator opens the circuit by manually opening the control switch LS–5. Opening of the lockout contact CR–1b prevents re-energization of the solenoid valve 41 in the event that the operator does not, following illumination of the green lamp GL, immediately release the control switch LS–5, in as much as the time relays TR–1 to TR–4 are subject to re-energization because the closed condition of the signal switches LS–1 to LS–4 following stopping of the motors. It is understood that the circuit could be modified as to the number of signal lamps and corresponding time relays for use with any number of tools or for use with only one stool.

The apparatus (FIGS. 1–2) is adapted to be suspended in position over the work by means of a cable 174 of a balancer, not shown. A handle 175 extending from a side of the tool is held by the operator during operation of the tool to hold the apparatus to the work. The control switch LS–5 is located proximate the handle 175 to permit ready operation thereof by the operator. It is also understood that the apparatus may be rigidly secured in a position relative to the work.

Figure 14:
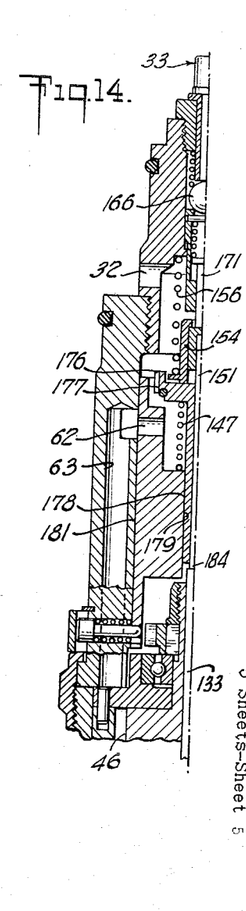
FIG. 14 is a modified form of the control valve structure.

In FIG. 14 the upper end of a tool unit is shown as having a modified control valve arrangement. In this form of the invention the pilot valve 135 shown in FIG. 3 is omitted, and the form of the control valve is modified. Here, the control valve designated 176 has a head portion 177 and a reduced stem 178 depending therefrom. The stem has a slide fit in an axial bore 179 provided by a thickened central area of the valve block 181. The control valve opening spring 147 limits between shoulders respectively of the head 177 of the valve and the valve block 181. The short control rod 151 extends with a slide fit through the stem 178 of the control valve, and normally depends for a slight distance, as at 184, below the stem. The bottom end of the short control rod rests directly upon the top end of the long control rod 133 which is of relatively greater diameter.

In the operation of this modified form of the invention, when the cam rollers 83 have reached the points T on the lower clutch member of maximum torque delivery, and the control rods 151, 133 have dropped in the manner earlier described, the control valve 176 closes under the action of its closing spring 156. Next, as the rollers reobtain their positions at the bottom of the troughs 91, as earlier explained (FIG. 13), preparatory to a recycling operation, the control rods 133, 151 are accordingly reelevated. In this latter action, the short control rod 151, together with the flanged spring cup 154 is caused to initially rise for a short distance of lost motion above the head 177 of the control valve as determined by the extent indicated at 184 to which the short control rod depends below the stem 178 of the control valve. Since the underside of the control valve is here vented directly through the radial ports 62 of the valve block 181 and connecting passages to the motor; and due to the structure of the head of the control valve, a close pressure differential developed above the seated control valve at this time holds the control valve closed against the opposing force of the opening spring 147. But, as the control rods are elevated higher to normal condition, the upper end of the long control rod 133 abuts the bottom end of the valve stem 178 and forces the control valve 176 slightly from its seat, whereupon inlet air leaks to the underside of the control valve to balance the air pressures on opposite sides thereof, thus enabling the opening spring 147 to pop the control valve to open condition. In this modified form of the control valve, the recycling operations occur at a greater frequency than in the form of the invention shown in FIG. 3.

Figure 6:
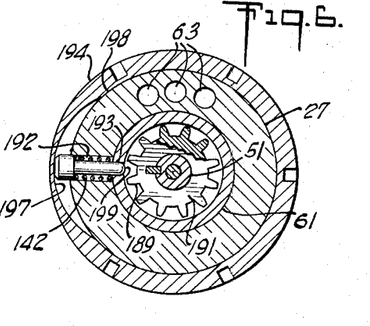
FIG. 6 is a section on line 6—6 of FIG. 3 showing in detail the motor cam-lock mechanism.

A further feature of the invention, is shown in FIG. 3 and detailed in FIG. 6. This feature is directed to means which permits the rotor 46 when at rest to be releasably locked against rotation so that a test torque may be applied to the output spindle 122 of the tool. This feature includes a headed pin 142 supported for radial slidable movement in the housing 27 and valve block 61 relative to the teeth 189 of a gear 191 keyed to the upper shaft 51 of the rotor. A compression spring 192 disposed between the head of the pin and the peripheral surface of the valve block 61 biases the pin outwardly of the housing so that the free end 193 of the pin is withdrawn clear of the gear teeth as in FIGS. 3 and 6, but remains supported by the wall of the valve block. The pin is movable into a groove between the cam teeth by means of a cam ring 194. The latter sleeves the housing and has relative rotation. It is restrained in surrounding relation to the head of the cam pin between a retainer ring 195 anchored in the housing of the tool and a ring nut 196 threaded about the housing. A trough or arcuate recess 197 in the inner wall of the cam ring defines a cam surface. When the low end of this cam surface abuts the head of the cam pin 142, the latter is tensioned outwardly by the spring 192 free of the teeth of the gear so that the rotor is free to rotate, as in FIGS. 3 and 6. When the cam ring is rotated to bring the high end 198 of the cam ring over the head of the cam pin, the latter is cammed inwardly against the resistance of the spring 192, and the free end of the pin moves in an opposed groove between the teeth of the gear to lock the rotor against rotation. This enables a test torque to be applied to the output spindle of the tool. To facilitate entry of the pin at all times into a groove between a pair of gear teeth, the pin is rounded at its free end 199 to provide a cam surface, and the crests of the teeth 189 of the gear are also slightly rounded. By this construction, if a gear tooth 189 rather than a groove of the gear should be directly opposite the pin when the latter is cammed inwardly, the rounded tip 199 of the pin will cooperate with the rounded surface of the gear tooth to rotate the rotor slightly to allow the pin to move into a groove between a pair of teeth. The cam ring 194 may be rotated manually, or by means of a spanner wrench.

Figure 5:
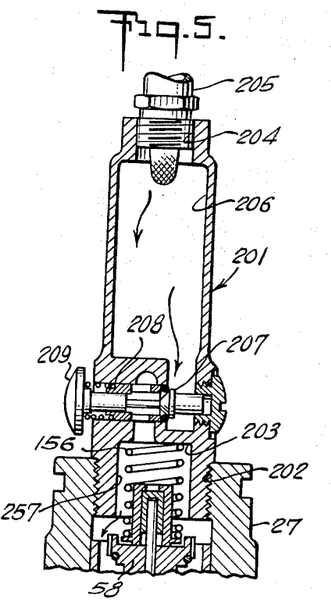
FIG. 5 is a detail showing the upper end of a nut running tool unit from which the electrical signal switch mechanism has been omitted and has been replaced by a throttle control valve fitting for use in single applications.

The form of the tool unit 24 shown in FIG. 3 may be readily modified as shown in FIG. 5 for use in single nut running applications apart from the multiple nut running apparatus. This may be done by removing from the housing 27 of the tool unit the manifold connecting fitting 199 and the associated signal switch mechanism 33 shown at the upper end of the housing in FIGS. 1 and 3, and replacing them with a throttle valve fitting 201, as shown in FIG. 5. The latter fitting is threadable in the upper end of the housing 27, as at 202. It provides a recessed shoulder 203 in its bottom end against which the valve closing spring 156 limits. It further includes a top end opening 204 adapted for connection by means of a hose line 205 with a source of operating air. The opening 204 communicates with an inlet chamber 206 within the fitting, which in turn leads through a throttle valve 207 to the control valve chamber 257. The fitting 201 is cylindrical and sufficiently elongated to permit it to be manually held by the operator. The throttle valve 207 is of a spring loaded type normally biased by its spring 208 to closed condition, and having an externally projecting stem portion 209 manually depressable by the operator to carry the throttle valve against the resistance of its spring to open condition. The operator may at will release the throttle valve to closed condition and thereby finally stop operation of the tool after the work has been tightened and after the tool has been allowed to recycle a few times. The stationary conditions which the output spindle reaches after the work has been driven home will indicate to the operator that the tool has begun to recycle, and that he may then elect at any time to release the throttle valve to closed condition.

While embodiments of the invention have been illustrated and described in detail, it is to be expressly understood that the invention is not limited thereto. Various changes may be made in the design and arrangement of its parts without departing from the spirit and scope of the invention; and it is intended, therefore, to claim the invention not only as shown and described herein, but also in all such forms and modifications as may reasonably be construed to fall within the spirit of the invention and the scope of the appended claims.

What is claimed is:

1. A pneumatic nut runner, comprising a pneumatic motor, an output spindle, a cam releasable clutch arranged to transmit rotation of the motor to the output spindle including a driving clutch member and a driven clutch member, the driven clutch member being axially disengageable relative to the driving clutch member upon the latter realizing a predetermined torque overload, control means responsive to axial disengaging movement of the driven clutch member to shut off operating air flow to the motor and as a consequence stop rotation of the driving clutch member, clutch spring means constantly urging the driven clutch member into engagement with the driving clutch member and being responsive to stopping of the rotation of the driving clutch member to re-engage the driven clutch member with the driving clutch member, and time delay control means responsive automatically to the re-engaging action of the clutch members to cause resumption of flow of operating air to the motor after an interval of time following stoppage of the motor.

2. A pneumatic nut runner comprising a pneumatic motor as in claim 1, wherein the driving clutch member is adapted to release its driving engagement with and overrun the driven clutch member upon experiencing said predetermined torque overload, and means is provided to arrest such overrun while the driving clutch member is still in contact with the driven clutch member and before it can drivingly re-engage with the latter.

3. A torque clutch controlled nut runner comprising a pneumatic motor, an output spindle, a torque releasable cam clutch coupling the motor to the spindle, means responsive to releasing action of the clutch to shut off pneumatic power so as to stop the motor, mechanical means responsive to stopping of the motor to briefly rotate the motor in a reverse direction to cause re-engagement of the clutch and to cause resumption of pneumatic power to restart the motor.

4. A torque controlled nut runner comprising a spindle, a pneumatic motor, a torque releasable cam clutch for transmitting torque of the motor to the spindle, the clutch including normally engaged driving and driven clutch members of which the driving member is adapted to release its driving relation with the driven member and the latter is simultaneously therewith caused to move axially from the driving clutch member upon attaining a predetermined torque, air flow control means responsive to the axial movement of the driven clutch member to shut off operating air flow to the motor, spring means responsive to stopping of the motor following shut-off of operating air flow to the latter to cause re-engagement of the clutch members, and time delay control means responsive to action of the spring means in re-engaging the clutch members to cause resumption of operating air flow to the motor after a predetermined lapse of time following re-engagement of the clutch members.

5. A torque controlled nut runner as in claim 4, including a control circuit, a signal lamp in the circuit, a signal switch in the nut runner closing the circuit to the signal lamp, and switch actuating means in the nut runner responsive to releasing action of the clutch to open the signal switch.

6. A torque controlled nut runner as in claim 5, including spring biased means in the nut runner responsive to the re-engaging action of the clutch to re-close the signal switch.

7. A torque controlled nut runner as in claim 6, wherein a pre-set time relay is connected in series with the signal switch and is adapted upon energization to effect closing of the circuit to the signal lamp.

8. A torque controlled nut runner as in claim 7, including a pneumatic power supply conduit connected with the nut runner, a normally closed solenoid operable main valve for controlling pneumatic flow through the supply conduit, a manually operable switch in the circuit adapted on closing to cause energization of the solenoid valve to open condition, and means in the circuit responsive to opening of the signal switch to de-energize the solenoid valve to closed condition.

9. A torque controlled nut runner as in claim 8, wherein the circuit includes a further signal lamp having a color different from that of the first mentioned lamp, and means is provided responsive to de-energization of the solenoid valve to energize the further signal lamp.

10. A torque controlled nut runner including a spindle; a pneumatic rotor; a torque releasable cam clutch drivingly coupling the rotor to the spindle; wherein the clutch includes a driving member rotatable with the rotor and having cam rollers in an end face thereof, a driven member cam pockets engaged by the cam rollers, a sloping cam tooth separating each pocket from the other, each tooth having a peak, a first sloping surface inclined upwardly to the peak from an adjacent pocket and an opposed sloping surface declining downwardly from the peak to the next adjacent pocket; a yieldable spring constantly urging the driven member into engagement with the driving member, the driven member adapted to move axially relative to the driving member upon attaining a predetermined torque and the driving member adapted simultaneously therewith to carry the rollers out of their pockets onto the first sloping surfaces; and means responsive to the latter action for automatically shutting off flow of operating air to the rotor and arresting rotation of the rollers upon the first sloping surface before the rollers can override the peaks of the cam teeth.

11. A torque controlled nut runner as in claim 10, wherein the spring acts automatically in response to the stopping of the rotor to return the driven clutch member axially to cause a camming action of the first sloping surfaces with the rollers and consequent reverse rotation of the rotor to return the rollers to re-engaged condition with their pockets.

12. A torque controlled nut runner as in claim 11, wherein means is provided for causing automatically in response to the return action of the spring resumption of flow of operating air to the rotor momentarily after re-engagement of the rollers is effected.

13. A torque controlled nut runner as in claim 10, wherein the radius of each pocket is substantially greater than the radius of the associated roller.

14. A torque controlled nut runner as in claim 13, wherein each pocket and an adjacent tooth provides a cam surface cooperable with a roller for transmitting torque from the roller to the driven member, which cam surface progressively increases in resistance to camming action of the rollers to a point at which an end of the pocket merges with the first sloping surface of the tooth at which maximum torque delivery occurs and progressively decreases in resistance to camming action of the rollers from such point to the peak of the tooth.

15. In combination: a gangplate; a plurality of nut running tools anchored to the gangplate; an operating air distributing manifold common to all of the tools and having an inlet port; a main operating air supply line connected to the inlet port; each tool having an inlet passage connected to the manifold, a pneumatically powered rotor, a spindle, and a torque releasable cam clutch for transmitting torque of the rotor to the spindle; the clutch in each tool being automatically releasable upon attaining a predetermined torque; means in each tool operable automatically in response to releasing action of its clutch to shut off flow of operating air from the manifold to its rotor and as a consequence cause stopping of the latter; means in each tool operable automatically in response to stopping of its rotor to cause re-engagement of its clutch and resumption of operating air flow to re-start its rotor; an electrical control circuit common to the plurality of tools; a separate switch contact in the circuit assigned to each tool; means in the control circuit and in each tool responsive to re-engagement of the related clutch to bring the corresponding assigned switch contact to a predetermined condition; and means in the control circuit responsive to all of the assigned contacts attaining said condition to shut off flow of operating air through the supply line to the manifold.

16. The combination of a gangplate; a plurality of nut running tools anchored to the gangplate; there being in each tool a spindle, a torque releasable clutch, pneumatically powered motor means for cycling the clutch until a predetermined torque delivery has been delivered through the clutch to the spindle, means operable automatically upon the clutch attaining such torque delivery to release the clutch and stop operation of the pneumatically powered motor means, and means operable automatically upon occurrence of the latter action to re-start operation of the pneumatically powered motor means so as to re-cycle the clutch, the clutch being releasable on the re-cycle operation upon re-attaining the said predetermined torque delivery; and electric circuit means common to all of the tools operable automatically to shut off pneumatic power simultaneously to all of the tools in response to the spindles of all of the tools attaining a predetermined torque delivery.

17. In a rotary power tool having a housing, a rotor, an output spindle, and a torque releasable clutch coupling the rotor to the spindle; cam lock means for selectively locking the rotor in stationary condition so as to permit a test torque to be applied to the spindle without causing consequent rotation of the rotor, the cam lock means comprising an axially extending shaft of the rotor having a gear fixed thereto, a pin slidably supported in the housing for radial movement relative to the periphery of the gear, spring means normally biasing the pin to a position disengaged from between the teeth of the gear, and manually operable cam means supported on the housing for selectively forcing the pin against the resistance of the spring means between the teeth of the gear.

18. A rotary power tool having a housing, a rotor having a shaft extending axially of the housing, an output spindle, a torque releasable clutch coupling the rotor to the spindle, and cam lock means selectively operable for locking the rotor in stationary condition so as to permit a test torque to be applied to the spindle without transmitting consequent rotation to the rotor, wherein the cam lock means comprises a gear fixed to the shaft of the rotor having alternately arranged longitudinally extending teeth and grooves, a cam pin slidably supported in the housing for radial movement relative to the periphery of the gear, the pin having a first position in the housing wherein an inner end thereof is clear of the teeth and the gear has relative rotation and a second position in the housing wherein the inner end of the pin is received in a groove of the gear and the gear is locked against relative rotation, spring means normally biasing the pin to its first position, a cam head on the outer end of the pin projecting in part in the first position of the pin externally of the housing, and cam means supported on the housing for selectively acting on the head of the pin to move the pin to its second position.

19. A rotary power tool as in claim 18, wherein the cam means is a ring sleeving the housing having an arcuate recess normally centered opposite to and receiving the head of the pin in the first position of the latter, the arcuate recess defining a cam surface movable over the head of the pin to cam the pin to its second position upon rotating the ring for a predetermined angular distance relative to the housing in either direction.

20. A rotary power tool as in claim 19, wherein the inner end of the pin is rounded and the crests of the gear teeth are rounded, whereby under cam pressure of the ring the inner end of the pin is cooperable with the crest of a gear tooth brought into register with the cam pin to apply a turning torque to the gear to bring a groove of the gear into register with the cam pin.

References Cited
UNITED STATES PATENTS

| | | | |
|---|---|---|---|
| 2,834,442 | 5/1958 | Sturrock | 173—12 |
| 3,059,620 | 10/1962 | Eckman | 173—163 |
| 3,180,612 | 4/1965 | Spyredakis et al. | 173—12 |
| 3,187,865 | 6/1965 | Blochowski | 173—12 |
| 3,242,996 | 3/1966 | Wright et al. | 173—12 |

FRED C. MATTERN, Jr., *Primary Examiner.*

L. P. KESSLER, *Assistant Examiner.*